United States Patent [19]

Usuki et al.

[11] Patent Number: 5,560,995
[45] Date of Patent: Oct. 1, 1996

[54] MAGNETIC RECORDING MEDIUM HAVING A FERROMAGNETIC METAL THIN FILM UPON WHICH IS COATED A PHOSPHOROUS AND FLUORINE CONTAINING COMPOSITION

[75] Inventors: Kazuyuki Usuki; Toshio Ishida; Tadashi Yasunaga, all of Odawara, Japan

[73] Assignee: Fuji Photo Film Co., Ltd., Kanagawa, Japan

[21] Appl. No.: 442,755

[22] Filed: May 17, 1995

[30] Foreign Application Priority Data

May 18, 1994 [JP] Japan .................................. 6-104064

[51] Int. Cl.$^6$ ....................................................... G11B 5/72
[52] U.S. Cl. ........................ 428/457; 428/694 TP; 428/694 TF; 428/694 TB; 428/900
[58] Field of Search ................... 428/694 TF, 694 TB, 428/900, 694 TP, 457

[56] References Cited

U.S. PATENT DOCUMENTS 4,735,848  4/1988  Kondo et al. ............................ 428/219
4,847,156  7/1989  Nishikawa et al. ................... 428/425.9
5,268,227  12/1993  Nishikawa et al. ..................... 428/336

*Primary Examiner*—Stevan A. Resan
*Attorney, Agent, or Firm*—Sughrue, Mion, Zinn, Macpeak & Seas

[57] ABSTRACT

The magnetic recording medium has a magnetic layer of a ferromagnetic metal thin film over at least one surface of a non-magnetic base, in which a phosphoric monoester compound which is represented by $R_1$—$OPO(OH)_2$, a florine-containing fatty acid ester compound which is represented by $R_2$—COO—$R_3$, and a fluorinated hydrocarbon in which some of the hydrogen atoms of a hydrocarbon having from 14 to 40 carbon atoms have been replaced by fluorine atoms, are present on the magnetic layer. $R_1$ is a hydrocarbon group having from 8 to 26 carbon atoms. $R_2$ and $R_3$ are each a hydrocarbon group having from 8 to 26 carbon atoms, or a fluorinated hydrocarbon group in which some or all of the hydrogen atoms of a hydrocarbon group having from 8 to 26 carbon atoms have been replaced by fluorine atoms. $R_2$ and $R_3$ may be the same or different from each other. At least either one of $R_2$ and $R_3$ contains fluorine atoms.

4 Claims, No Drawings

MAGNETIC RECORDING MEDIUM HAVING A FERROMAGNETIC METAL THIN FILM UPON WHICH IS COATED A PHOSPHOROUS AND FLUORINE CONTAINING COMPOSITION

BACKGROUND OF THE INVENTION

The present invention relates to a magnetic recording medium having a ferromagnectic metal thin film as a magnetic layer. More particularly, the present invention relates to a metal thin film type magnetic recording medium which is made excellent in running properties, durability and shelf stability by specifying the composition of a lubricant which is to be present on the magnetic layer.

Magnetic recording mediums, e.g. magnetic tapes, floppy disks, etc., are commonly coated at the magnetic layer surface thereof with a lubricant to improve lubrication between the magnetic recording medium and the head and to enhance the running durability of the magnetic recording medium.

Particularly, the magnetic layer surfaces of magnetic recording mediums have become smoother as a result of achievement of high recording density. Further, magnetic recording mediums are used under various environmental conditions, and information recorded thereon is usually stored for a long period of time ranging from several years to several tens of years. Accordingly, magnetic recording mediums are demanded to have running durability and shelf stability under a wide variety of environmental conditions. Under these circumstances, conventional lubricants have become unable to produce satisfactory effect.

Further, small-sized video tape recorders such as cam coders, i.e., video tape recorders having a camera integrated therewith, and 8-mm video tape recorders are often used outdoor. Therefore, magnetic recording mediums are demanded to endure use in a wide range e,f environmental conditions.

To improve magnetic properties required for high density recording, e.g., high-vision recording, digital recording, etc., metal thin film type magnetic recording mediums which use a ferromagnetic metal thin film as a magnetic layer, and which are useful for high-density recording have been expected. However, in a metal thin film type magnetic recording medium, the magnetic layer is protected by only an extremely thin metallic oxide layer. Therefore, it has been demanded to provide a lubricant layer material which is capable of not only ensuring running properties and durability but also markedly improving shelf stability of metal thin film type magnetic recording mediums.

Metal thin film type magnetic recording mediums are being improved so as to enable achievement of higher-density recording by smoothing the surface and also changing the composition of the magnetic layer from CoNi—O to Co—O or Co—Fe that contains Co—O, etc. so as to attain high Bm. With the conventional metal thin film type magnetic recording mediums that have a high cobalt content, however, it has heretofore been difficult to obtain stable running properties, favorable durability and corrosion resistance.

Studies have also been conducted of a method for improving durability by forming on the magnetic layer a protective layer of, for example, silica, alumina, titania, graphite, amorphous carbon, cobalt oxide, titanium nitride, chromium carbide, etc. With this method, however, the thickness of the protective film must be increased in order to obtain satisfactory protective action, resulting in spacing loss. Accordingly, the output reduces, and the achievement of high recording density is hindered, unfavorably.

Under the above-described circumstances, hydrocarbon- or fluorine-containing lubricants which have various structures, and which are excellent in lubricating performance have been examined as being lubricants for metal thin film type magnetic recording mediums, and it is known that an organic fluorine compound having a hydrophilic functional group in a molecule thereof in particular is capable of improving running durability to a considerable extent.

However, even if a lubricant having excellent characteristics is used, a smooth metal thin film type magnetic recording medium having improved electromagnetic transducing characteristics suffers from the problem that the lubricant attached to the surface of the magnetic layer is gradually lost because of repeated siding movement, resulting in deterioration of the characteristics.

Under these circumstances, one approach that has heretofore been made to improve the characteristics is to introduce various polar groups into the lubricant. For example, Japanese Patent Application Laid-Open (KOKAI) No. 59-119537 and Japanese Patent Application Post-Examination Publication No. 04-50644 disclose a technique in which a carboxyl group, an ester group, and a phosphoric ester are introduced. The disclosed technique involves, however, the problem that repeated running durability at low temperature is inferior. There have also been made many studies to improve the characteristics by using two or more different kinds of lubricant in combination.

For example, Japanese Patent Application Laid-Open (KOKAI) No. 62-141625 discloses the use of a carboxylic acid and a fluorine-containing ester in combination. With this method, the repeated running durability at low temperature can be markedly improved in comparison to a case where each lubricant is used alone. However, the magnetic recording medium using a carboxylic acid and a fluorine-containing ester in combination has the problem that it is inferior in corrosion resistance, particularly shelf stability under high-temperature and high-humidity environmental conditions.

Japanese Patent Application Laid-Open (KOKAI) Nos. 62-236120 and 62-103824 disclose the use of a phosphoric triester or a phosphoric diester and a fluorine-containing ester lubricant. However, since triesters and diesters exhibit weak adsorption to a magnetic film, the wear resistance cannot be improved. Therefore, satisfactory characteristics cannot necessarily be obtained.

Japanese Patent Application Laid-Open (KOKAI) No. 04-205712 proposes a method in which a lubricant layer is formed from two different kinds of lubricant, and in which the amounts of lubricant at the magnetic layer side and at the back coat layer side are specified. With this method also, however, no satisfactory lubricating properties can be obtained.

Japanese Patent application Post-Examination Publication No. 57-29767 and Japanese Patent Application Laid-Open (KOKAI) Nos. 58-188326, 60-63711, 60-63712, 62-209718 and 01-211215 disclose a method in which a lubricant is applied to a back coat layer provided on the side of a magnetic recording medium which is reverse to the side thereof on which a magnetic layer is formed, thereby enabling the lubricant to be appropriately supplied from the back coat layer to the magnetic layer surface where the lubricant is gradually lost by sliding movement. Such a coating method enables an improvement in repeated running durability. However, when a lubricant is coated on only the back coat layer, durability is difficult to ensure; when a lubricant is coated on both the back coat layer and the magnetic layer, a surplus of lubricant is inevitably present on the magnetic layer. Consequently, the coefficient of static friction rises, giving rise to problems such as undesired sticking of the magnetic recording medium.

In terms of corrosion resistance, which is a problem in practical use of magnetic recording mediums that use a ferromagnetic metal thin film as a magnetic layer, the required corrosion resistance cannot sufficiently be ensured by only a fluorine-containing lubricant having a polar group in a molecule thereof. Accordingly, it has been proposed to use such a lubricant in combination with a rust preventive. However, it has heretofore been difficult to ensure the required corrosion resistance by the combined use of a lubricant and a rust preventive that are selected from those which are generally known.

An object of the present invention is to provide a magnetic recording medium which has the coefficient of friction stabilized at a low level, and which is excellent in still durability, repeated running durability and corrosion resistance and capable of high-density magnetic recording in particular.

SUMMARY OF THE INVENTION

The above-described object of the present invention is attained by a magnetic recording medium having a magnetic layer of a ferromagnetic metal thin film over at least one surface of a non-magnetic base, wherein a phosphoric monoester compound which is represented by the following chemical formula (1), a fluorine-containing fatty acid ester compound which is represented by the following chemical formula (2), and a fluorinated hydrocarbon in which some of the hydrogen atoms of a hydrocarbon having from 14 to 40 carbon atoms have been replaced by fluorine atoms, are present on the magnetic layer:

$$R_1\text{—OPO(OH)}_2 \qquad (1)$$

where $R_1$, is a hydrocarbon group having from 8 to 26 carbon atoms.

$$R_2\text{—COO—}R_3 \qquad (2)$$

where $R_2$ and $R_3$ are each a hydrocarbon group having from 8 to 26 carbon atoms, or a fluorinated hydrocarbon group in which some or all of the hydrogen atoms of a hydrocarbon group having from 8 to 26 carbon atoms have been replaced by fluorine atoms; $R_2$ and $R_3$ may be the same or different from each other; and at least either one of $R_2$ and $R_3$ contains fluorine atoms.

DESCRIPTION OF THE PREFERRED EMBODIMENTS

That is, the magnetic recording medium of the present invention has a magnetic layer of a ferromagnetic metal thin film which is formed on a non-magnetic base, in which three different kinds of compound, i.e., a phosphoric monoester compound having a specified number o f carbon atoms, a fluorine-containing fatty acid ester compound having a specified number of carbon atoms, and a fluorinated hydrocarbon having a specified number of carbon atoms, are allowed to be present on the magnetic layer as lubricant, thereby achieving improvement in all practical problems of ferromagnetic metal thin film type magnetic recording mediums, i.e., running properties, durability and corrosion resistance.

It is considered that the phosphoric monoester compound in the magnetic recording medium of the present invention is firmly adsorbed on the magnetic layer, or forms a firm protective film by chemical reaction with the metallic element constituting the magnetic layer. Thus, the phosphoric monoester compound can improve particularly corrosion resistance to a considerable extent.

Further, by being used in combination with the fluorinated hydrocarbon, the fluorine-containing fatty acid ester compound has adsorptivity to the ferromagnetic metal thin film. However, since the adsorptivity is not so high as that of the phosphoric monoester compound, it is possible to obtain fluid lubricating properties based on the behavior of non-adsorption molecules. On the other hand, since the fluorinated hydrocarbon has no polar group in a molecule thereof, it is possible to expect the fluorinated hydrocarbon to exhibit higher fluid lubricating properties than those of the fatty acid ester.

Further, a fluorinated hydrocarbon compound has relatively good compatibility with a fluorine-containing fatty acid ester compound, and is therefore capable of suppressing aggregation and precipitation of the fatty acid ester compound on the magnetic layer. Accordingly, it is possible to expect even more excel lent fluid lubricating properties to be obtained by using the two compounds in combination.

As has been described above, the magnetic recording medium of the present invention uses both a fluorine-containing fatty acid ester compound and a fluorinated hydrocarbon compound, thereby making it possible to suppress crystallization of the two compounds. Accordingly, these compounds can be readily formed into a uniform mixed lubricant film, and they can exhibit their advantages even more satisfactorily than in a case where each compound is used alone.

A significant feature of the present invention resides in that still durability and repeated running durability can be improved to such a considerable extent as cannot be expected from the characteristics of each of the compounds.

In the magnetic recording medium of the present invention, further, a back coat layer is provided on the side of the magnetic recording medium which is reverse to the side thereof on which the magnetic layer is provided, and the above-described fatty acid ester and fluorinated hydrocarbon are allowed to be present in the back coat layer or on the surface thereof, thereby enabling the lubricant to be transferred from the back coat layer to the magnetic layer surface, where the lubricant is gradually lost by sliding of the magnetic layer surface on a magnetic head, when the tape-shaped medium is wound up. Thus, the magnetic layer can be replenished with lubricant. Accordingly, it is possible to obtain excellent repeated running durability.

Accordingly, the features of the magnetic recording medium of the present invention can be effectively utilized when the magnetic recording medium has a tape-like shape.

Further, the magnetic layer can be improved in wear resistance in particular by forming on the magnetic layer a protective layer of an oxide, e.g., silica, alumina, titania, zirconia, cobalt oxide, etc., a nitride, e.g., titanium nitride, a carbide, e.g., chromium carbide, carbon, e.g., graphite, amorphous carbon, etc., and allowing the above-described three lubricant compounds to be present on the protective film.

The principal arrangement of the present invention, together with the action and effect thereof, have been briefly described above in order to facilitate the understanding of the essential features of the present invention. Each constituent feature of the present invention will be described below more specifically.

The phosphoric monoester compound in the magnetic recording medium of the present invention has a molecular structure which is represented by the above-described chemical formula (1). The hydrophobic chain $R_1$ of the phosphoric monoester compound has from 8 to 26 carbon atoms, preferably from 10 to 20 carbon atoms. The hydrocarbon group is preferably a straight-chain, saturated hydrocarbon group, but it may be an unsaturated hydrocarbon group, or a hydrocarbon group having a branched structure in which a side chain has been introduced.

If the number of carbon atoms is excessively small, no favorable protective effect can be obtained, whereas, if it is excessively large, crystallizability increases, causing the coatability to reduce. As a result, the lubricating effect deteriorates, unfavorably.

Further, a part of the phosphoric monoester may be a phosphoric diester. In such a case, the proportion of the phosphoric diester should be limited to 50%, preferably 30%, by weight of the phosphoric monoester. If the proportion of the phosphoric diester is excessively high, the purpose of the present invention cannot satisfactorily be attained.

Specific phosphoric monoester compounds usable in the magnetic recording medium of the present invention include $C_{12}H_{25}OPO_3H_2$, $C_{16}H_{33}OPO_3H_2$, $C_8H_{17}OPO_3H_2$, $C_{18}H_{37}OPO_3H_2$, $C_{18}H_{35}OPO_3H_2$, and $C_{18}H_{37}OPO_3H_2$.

Among the above-mentioned compounds, $C_{12}H_{25}OPO_3H_2$, $C_{16}H_{33}OPO_3H_2$, and $C_{18}H_{37}OPO_3H_2$ are preferable because high boundary lubricating properties can be obtained with these compounds.

The fluorine-containing fatty acid ester compound, which is used in combination with the phosphoric monoester compound, has a molecular structure which is represented by the above-described chemical formula (2). Each of the hydrophobic chains ($R_2$ and $R_3$) is preferably a straight-chain, saturated hydrocarbon or a fluorinated straight-chain, saturated hydrocarbon. The hydrophobic chain may have an unsaturated bond or a branched structure therein. Regarding the hydrophobic chain length, the hydrophobic chain has from 8 to 26 carbon atoms, preferably from 8 to 20 carbon atoms, more preferably from 8 to 18 carbon atoms.

If the number of carrion atoms is excessively small, no favorable protective effect can be obtained, whereas, if it is excessively large, crystallizability increases, making it impossible to realize uniform coating.

Further, in order to suppress the volatility of the lubricant and obtain favorable lubricating effect, it is preferable that at least one of the two hydrophobic chains in the molecule should have 10 or more carbon atoms.

Specific examples of the above-described fluorine-containing fatty acid ester compound are fluorine-containing esters: $C_8F_{17}COOC_{18}H_{37}$, $C_8F_{17}(CH_2)_2COOC_{18}H_{37}$, $C_{17}H_{35}COO(CH_2)_2C_8F_{17}$, $C_{17}H_{33}COO(CH_2)_2C_8F_{17}$, $C_{17}H_{31}COO(CH_2)_2C_8F_{17}$, $C_8F_{17}(CH_2)_{10}COO(CH_2)_{10}C_8F_{17}$, etc.

The sum total of carbon atoms in the two hydrophobic chains ($R_2$ and $R_3$) is preferably from 24 to 38, more preferably from 24 to 30, with a view to obtaining excellent lubricating properties.

From the viewpoint of production cost and environmental protection, these fluorine-containing lubricants are preferably dissolved in an ordinary organic solvent. For this purpose, it is preferable to use a compound which has a hydrocarbon chain containing no fluorine at one ester linkage, or to adjust the proportion of the alkyl portion of the fluoroalkyl group to the perfluoroalkyl group so that the solubility is improved. When an ester which has high crystallizability and a high melting point is used, precipitation may occur on the surface of the magnetic layer or on the surface of the back coat layer. Therefore, it is preferable to use an ester having a melting point of 30° C. or lower when the lubricating properties at low temperature are further taken into consideration.

The fluorinated hydrocarbon which is used as a lubricant in the magnetic recording medium of the present invention has from 14 to 40 carbon atoms, preferably from 16 to 28 carbon atoms, more preferably from 18 to 24 carbon atoms, in which some hydrogen atoms have been replaced by fluorine atoms. If the number of carbon atoms is excessively large, crystallizability increases, causing; still durability and repeated running durability to be deteriorated. If the number of carbon atoms is excessively small, the volatility becomes unfavorably high, which may cause the characteristics to deteriorate with time.

Regarding the ratio of fluorine atoms in the carbon chain, the ratio of the number of hydrogen atoms to the number of fluorine atoms is preferably in the range of from 3:1 to 1:2. If the ratio of the number of fluorine atoms to the number of hydrogen atoms is excessively high, the solubility in an ordinary organic solvent (hydrocarbon solvent containing no fluorine) and coatability may be impaired.

The fluorinated hydrocarbon in the present invention may be a straight-chain, saturated hydrocarbon in which either or both of the terminals have been replaced by fluorine, or which has a branched structure, or which has an unsaturated bond. Thus, various kinds of fluorinated hydrocarbon may be used.

Specific examples are, $CF_3(CF_2)_9(CH_2)_{15}CH_3$, $CF_3(CF_2)_7(CH_2)_{17}CH_3$, $CF_3(CF_2)_7(CH_2)_6(CF_2)_7CF_3$, $(CF_3)_2CF(CF_2)_4(CH_2)_{15}CH_3$, $(CF_3)_2CF(CF_2)_4(CH_2)_8(CF_2)_4CF(CF_3)_2$, etc.

Among them, preferable compounds are those which have fluorinated molecular chains at both terminals, or those which have a fluorinated, branched molecular chain at either or each terminal. Such hydrocarbon compounds are superior in fluid lubricating properties.

Regarding the amount of the above-described three lubricant compounds present on the magnetic layer of the magnetic recording medium according to the present invention, assuming that the weight of the phosphoric monoester present on the magnetic layer is A, the weight of the fluorine-containing fatty acid ester is B, and the weight of the fluorinated hydrocarbon is C, the total amount of three compounds present per unit area is 1 mg/m² <A+B+C<50 mg/m², preferably 2 mg/m/m² <A+B+C<20 mg//m², particularly preferably 5 mg/m² <A+B+C<10 mg/m².

If the amount of lubricant present on the magnetic layer is excessively small, the purpose of the present invention cannot satisfactorily be attained, whereas, if it is excessively large, the coefficient of static friction rises, undesirably.

The mixture ratio of the above-described three different kinds of compound, which are allowed to be present on the magnetic layer of the present invention, is preferably set as follows.

If the three compounds are mixed together in approximately equal amounts in the weight ratio of approximately 1:1:1, the resulting mixture is effective.

More specifically, assuming that the weight of the phosphoric monoester is A, the weight of the fluorine-containing fatty acid ester is B, and the weight of the fluorinated hydrocarbon is C, it is preferable to satisfy the condition of $0.2<A/(B+C)<10$, more preferably $1.0<A/(B+C)<5$. In this case, it is preferable to satisfy the condition of $0.1<C/B<2$, more preferably $0.1<C/B<1$.

If the proportion of the phosphoric monoester compound is excessively low, wear resistance becomes insufficient, whereas, if it is excessively large, precipitation occurs on the magnetic layer surface, or the coefficient of friction is increased.

If the proportion of the fluorine-containing fatty acid ester compound is excessively low, repeated running durability is deteriorated, and particularly, the magnetic head contamination at low humidity increases. If the proportion of the fluorine-containing fatty acid ester compound is excessively high, precipitation occurs on the surface of the magnetic layer, and the coefficient of friction is increased.

If the proportion of the fluorinated hydrocarbon is excessively low, still durability is deteriorated, whereas, if it is excessively high, precipitation occurs on the surface of the magnetic layer, and the coefficient of friction is increased.

In a case where there is a back coat layer on the side of the non-magnetic base which is reverse to the s i de thereof on which the magnetic layer is provided, it is desirable that the total amount of lubricant, the mixture ratio of the three different kinds of compound, and the ratio of the amount of fatty acid ester and fluorinated hydrocarbon present on the magnetic layer side to the amount thereof on the back coat layer side should be set as follows:

Assuming that the weight of the phosphoric monoester present on the back coal; layer is A', the weight of the fluorine-containing fatty acid ester present on the back coat layer is B', the weight of the fluorinated hydrocarbon present on the back coat layer is C', the weight of the phosphoric monoester present on the magnetic layer is A, the weight of the fluorine-containing fatty acid ester present on the magnetic layer is B, and the weight of the fluorinated hydrocarbon present on the magnetic layer is C, the coating weight per unit area is set so as to satisfy the condition of 2 mg/m$^2$<A'+B'+C'<50 mg/m$^2$, preferably 5 mg/m$^2$<A'+B'+C'<30 mg/m$^2$, particularly preferably 10 mg/m$^2$<A'+B'+C'<20 mg/m$^2$. It is also preferable to satisfy the condition of $0.01<(A+B+C)/(A'+B'+C')<10$, more preferably $0.1<(A+B+C)/(A'+B'+C')<2$. Further, it is preferable to satisfy the condition of $0.01<A'/(B'+C')<1$, more preferably $0.05<A'/(B'+C')<0.5$. In this case, it is preferable to satisfy the condition of $0.1<C'/B'<2$, more preferably $0.1<C'/B'<1$.

That is, to enable the effect of the present invention to be exhibited satisfactorily and to transfer the above-described three compounds functioning as lubricant to the magnetic layer surface or to the surface of the protective film on the magnetic layer, it is advantageous to retain a relatively large amount of lubricant by a back coat layer, which generally has a much larger number of voids than that of a ferromagnetic metal thin film.

In a case where there is a protective film on the magnetic layer, and the above-described three lubricant compounds are allowed to be present thereon, the amount of compounds present on the protective film and the mixture ratio thereof are essentially the same as those in a case where the lubricant compounds are allotted to be present directly on the magnetic layer. However, when a material which is less hydrophilic than a metal or metallic oxide constituting a ferromagnetic metal thin film, such as a carbon film, is present as a protective film on the ferromagnetic metal thin film, it is likely that the lubricant will precipitate, and the coefficient of friction will rise. In such a case, therefore, it is necessary to reduce the amount of lubricant compounds present on the protective film.

In the magnetic recording medium of the present invention, the lubricant compounds can be allowed to be present on the magnetic layer surface, the back coat layer or the protective film by either an intermix application method in which a phosphoric monoester compound, a fluorine-containing fatty acid ester compound and a fluorinated hydrocarbon, which are used as lubricants, are dissolved in an organic solvent, and the resulting solution is coated, or a successive application method in which after the phosphoric monoester compound has been coated, a mixture of the fluorine-containing fatty acid ester compound and the fluorinated hydrocarbon is coated. However, since the phosphoric monoester compound has excellent adsorptivity to the magnetic layer or the back coat layer or the protective film, it is preferable to form, first, a lubricant layer of a phosphoric monoester compound and, thereafter, form a lubricant layer of a fluorine-containing fatty acid ester compound.

It is particularly preferable to employ a method in which, after a solution of a phosphoric monoester compound in an organic solvent has been coated on the magnetic layer and dried, a back coat layer containing a hydrocarbon system fatty acid ester compound, or a fatty acid ester compound having a part thereof replaced by fluorine, and a fluorinated hydrocarbon compound are formed, and then the magnetic recording medium is wound up, thereby transferring the lubricant of the fluorine-containing fatty acid ester compound contained in the back coat layer to the surface of the magnetic layer.

As the back coat layer, a coating film which has heretofore been known can be used. That is, it is possible to use a coating film formed by dispersing non-magnetic fine particles, e.g., carbon black, in a binder resin.

The thickness of the back coat layer is preferably in the range of from 0.3 μm to 1.0 μm.

As the magnetic recording medium is run, the fluorine-containing fatty acid ester compound and the fluorinated hydrocarbon gradually reduce in amount, but these compounds are supplied from the back coat layer when the magnetic recording medium is wound up. Therefore, there is substantially no change in the amount of fluorine-containing fatty acid ester compound and fluorinated hydrocarbon compound present on the surface of the magnetic layer. Thus, favorable running durability can be obtained.

Hitherto, when a fluorine-containing compound is coated directly on the surface of the magnetic layer by using an organic solvent, even if the compound is soluble in the organic solvent, fine coating unevenness and precipitation of the compound are likely to occur during drying after coating. However, with the method in which the lubricant of a fluorine-containing fatty acid ester compound is transferred from the back coat layer, the lubricant can be transferred from the back coat layer to the magnetic layer side by contact when the magnetic recording medium is wound up, by mixing or coating the back coat layer with the lubricant of a fluorine-containing fatty acid ester compound. Therefore, coating unevenness is more unlikely to occur, and precipitation of the lubricant is also more unlikely to occur than in a case where the lubricant is coated directly on the magnetic layer. Accordingly, the number of kinds of lubricant usable advantageously increases.

To allow the back coat layer to contain a fluorine-containing fatty acid ester compound and a fluorinated hydrocarbon compound, it is possible to adopt a method in which a fluorine-containing fatty acid ester compound and a fluorinated hydrocarbon compound are coated on a back coat layer formed in advance, or a method in which, when a back coat layer is to be formed, a coating solution for the back coat layer is mixed with a fluorine-containing fatty acid ester compound and a fluorinated hydrocarbon compound. In a case where each compound for a lubricant is applied to the surface of the back coat layer as described above, an adsorption film in which the phosphoric monoester compound adheres closely can be formed, and it is therefore possible to produce a medium which is more excellent in wear resistance than in a case where each lubricant compound is coated directly on the magnetic layer or on the protective film. In addition, since the fluorine-containing fatty acid ester compound and the fluorinated hydrocarbon compound are present on the adsorption film of the phosphoric monoester compound, even more favorable lubricating characteristics are exhibited than in a case where a mixture of a phosphoric monoester compound and a fluorine-containing fatty acid ester compound is coated.

Since the above-described three lubricant compounds are soluble in an organic solvent consisting mainly of a hydrocarbon solvent, which is selected from among acetone, methyl ethyl ketone, methyl isobutyl ketone, cyclohexanone, methanol, ethanol, and isopropanol, the compounds can be coated and dried to produce a magnetic recording medium without using a fluorine-containing organic solvent. Thus, since the lubricant compounds can be dissolved in a hydrocarbon solvent, there is no likelihood of causing an environmental problem such as destruction of the ozone layer as in the case of conventional fluorine-containing compounds; this is an exceedingly great advantage in practical use.

The fact that a lubricant consisting mainly of a phosphoric monoester compound forms a lubricant layer which is extremely firmly adsorbed on the surface of the magnetic recording medium of the present invention can be confirmed by determining the amounts of fluorine and phosphorus contained in the lubricant by an ESCA, XPS or other analyzer after the surface of the magnetic recording medium has been washed with a solvent. That is, a magnetic recording medium in which a fluorine-containing fatty acid ester compound has been transferred from a back coat layer onto a lubricant layer containing a phosphoric monoester compound has no change in the amount of phosphorus even if it is washed, but substantially no fluorine is detected from the medium by measurement. For a magnetic recording medium having a lubricant which is formed by a successive application method or an intermix application method, on the other hand, measured values for the amounts of phosphorus and fluorine are such that the amount of phosphorus is somewhat reduced by washing, but the amount of fluorine is almost the same as that before washing, although it slightly decreases.

The above-described three compounds for lubricant in the magnetic recording medium of the present invention may be formed on a protective film after the protective film has been formed on the ferromagnetic metal thin film by using an oxide, e.g., silica, alumina, titania, zirconia, cobalt oxide. etc., a nitride, e.g., titanium nitride, a carbide, e.g., chromium carbide, carbon. e.g., graphite, amorphous carbon, etc. In this case, the effect of the protective film can be further enhanced.

That is, the effect of the lubricant in the present invention is added to the protecting function of the protective film, thus making it possible to realize a magnetic recording medium which satisfactorily endures sliding movement on a magnetic head under severe conditions, and in which the medium surface will not wear and is capable of maintaining the lubricating properties for a long time.

Accordingly, the protective film is preferably a rigid film having a hardness which is equal to or higher than that of the head material. It is preferable to use a carbon protective film because it is unlikely to cause seizing during sliding and the effect thereof lasts stably.

The above-described carbon protective film is a carbon film having a structure selected from among amorphous, graphite and diamond structures, and a mixture of these structures, which is formed by plasma CVD, sputtering, etc. A rigid carbon film, which is generally known as "diamond-like carbon", is particularly preferable. This carbon film is a rigid carbon film having a Vickers hardness of not lower than 1,000 $kg/mm^2$, preferably not lower than 2,000 $kg/mm^2$. The carbon film has an amorphous crystal structure and is non-electrically conductive. When measured by Raman spectroscopy, the structure of the diamond-like carbon film in the invention of the present application can be confirmed by detecting a peak in the range of from 1,520 to $1,560^{-1}$ cm. If the structure of the carbon film deviates from the diamond-like structure, the peak that is detected by Raman spectroscopy deviates from the above range, and the hardness of the carbon film also lowers. Thus, it becomes difficult to attain the purpose of the invention of the present application.

The structure of the diamond-like carbon film in the invention of the present application can also be identified by X-ray electron spectroscopy for chemical analysis (ESCA) in addition to Raman spectroscopy. Particularly, when the film structure is identified by ESCA, if the plasmon loss energy for C-1s is 26±1 eV, an even more favorable carbon film is obtained. The term "plasmon loss energy" is herein employed to mean the deviation due to plasmon loss of a peak from the main peak in C-1s spectrum measured by irradiating the carbon film with X-rays, and the deviation is measured by an X-ray electron spectroscope (e.g., PHI-560, manufactured by Perkin-Elmer). As the hardness of the carbon protective film reduces, friction characteristics are improved, but wear resistance becomes insufficient, so that it is impossible to obtain the desired running durability. Particularly, still durability lowers to a considerable extent. The diamond-like carbon protective films can be produced by sputtering or CVD. However, it is preferable to produce them by CVD from the viewpoint of productivity and the stability of quality and also from the viewpoint that favorable wear resistance can be ensured even with an ultra-thin film having a thickness of 10 nm or less. It is particularly preferable that chemical species decomposed by a radio-frequency plasma should be accelerated by applying a bias voltage to the substrate.

There is no particular restriction on the material used to form a carbon protective film, that is, the carbon compound that is formed into a plassma. However, examples include hydrocarbon, ketone and alcohol compounds.

It is particularly preferable to form a rigid carbon protective film by plasma CVD using as a raw material a carbon-containing compound such as an alkane, e.g., methane, ethane, propane, butane, etc., or an alkene, e.g., ethylene, propylene, etc., or an alkyne, e.g., acetylene.

In general, such a film-forming material is introduced into a plasma generating apparatus at a partial pressure in the range of from 13.3 to 0.133 $N/m^2$, preferably from 6.67 to 2.67 $N/m^2$. It is also possible to introduce an inert gas, e.g., hydrogen, argon, etc., simultaneously with the above-described raw material gas. In this case, an example of a desirable mixture of gases is a mixture of a hydrocarbon such as methane and argon. In general, the ratio of hydrocarbon to argon is preferably in the range of from 6:1 to 2:1.

If the film thickness of the rigid carbon protective film is excessively large, the electromagnetic transducing characteristics are deteriorated, and the adhesion to the magnetic layer lowers, whereas, if the film thickness is excessively small, the wear resistance becomes insufficient. Therefore, the film thickness is preferably in the range of from 2.5 to 20 nm, particularly preferably in the range of from 5 to Further, the surface of the rigid carbon protective film may be treated with an oxidizing or inert gas for the purpose of further improving the adhesion of the rigid carbon protective film to the lubricant applied to the surface thereof.

The ferromagnetic metal thin film that constitutes the magnetic layer in the magnetic recording medium of the present invention is preferably formed from a conventionally known metal or alloy consisting essentially of cobalt by oblique-incidence vacuum deposition in an atmosphere containing a trace of oxygen. To improve electromagnetic transducing characteristics, it is particularly preferable to use Co—O, Co—Fe that contains Co—O, etc., in which not less than 90% of the metal atoms constituting the magnetic layer is cobalt. It is further preferable that not less than 95%, more preferably not less than 97%, of the metal atoms should be cobalt. The thickness of the magnetic layer is preferably in the range of from 100 to 3,000 nm, more preferably from 120 to 2,000 nm.

To improve electromagnetic transducing characteristics, the ferromagnetic metal thin film may be formed in a multilayer structure or may have a non-magnetic primary coat layer and an intermediate layer. Ferromagnetic metal thin films in which almost all the metal atoms constituting the magnetic layer is cobalt have heretofore been considered to be excellent in magnetic properties but inferior in weathering resistance and unfavorable in terms of running properties and durability in practical use. However, the use of a lubricant layer as in the present invention makes it possible to produce a magnetic recording medium which is excellent in corrosion resistance, running properties and durability, and which is satisfactorily fit for practical use even if the ferromagnetic metal thin film has a chemical composition in which not less than 90% of the metal atoms is cobalt, as described above.

In the magnetic recording medium of the present invention, further, a perfluoro polyether may be jointly used as a lubricant compound. A perfluoro polyether may be coated directly on the magnetic layer. However, it is more desirable to adopt a method in which a perfluoro polyether which has been applied to the back coat layer is transferred to the magnetic layer, in order to minimize the disorder of orientation of the phosphoric monoester compound.

Examples of perfluoro polyethers usable in the present invention include perfluoromethylene oxide, perfluoroethylene oxide polymer, perfluoro-n-propylene oxide polymer $(CF_2)CF_2CF_2 O)_n$, perfluoroisopropylene oxide polymer $(CF(CF_3)CF_2O)_n$, and copolymers of these polymers. Perfluoro polyethers used in the present invention may contain a polar group, e.g. an alcohol a methyl ester group, etc. Specific examples are KRYTOX 143AZ and 157SL, manufactured by Du Pont Co., Ltd., FOMBLIN Z-DOL and Z-DEAL, manufactured by Montefluos, and so forth.

When a perfluoro polyether is to be used, it may be mixed in a back coat layer coating solution in the same way as a fluorine-containing fatty acid ester compound. Alternatively, the perfluoro polyether may be mixed in a fluorine-containing fatty acid ester compound when the compound is to be coated on the back coat layer produced in advance.

As a non-magnetic base for the magnetic recording medium of the present invention, a synthetic resin film having a thickness of 3 μm to 10 μm is preferably used. Examples include polyethylene terephthalate, polyethylene naphthalate, polyimide, polyamide, and polyamide-imide. With a view to improving running properties, it is preferable to apply an inorganic filler having a particle diameter of from 5 to 20 nm to the surface of the non-magnetic base. The non-magnetic base may also be arranged so that such a filler is contained inside the base, and irregularities are formed on the surface of the base.

Although the magnetic recording medium of the present invention has excellent anti corrosion properties, the corrosion resistance can be further enhanced by jointly using a heterocyclic rust preventive. Examples of rust preventives usable in the present invention include nitrogen-containing heterocyclic compounds, e.g. benzotriazole, benzimidazole, purine, pyrimidine, etc., derivatives obtained by introducing an alkyl side chain or like into the nuclei of these nitrogen-containing heterocyclic compounds, nitrogen- or sulfur-containing heterocyclic compounds, e.g. benzothiazole, 2-mercaptobenzothiazole, a tetrazinedene cyclic compound, a thiouracil compound, etc., and derivatives of these compounds.

Examples of tetrazinedene cyclic compounds usable for this purpose are those which are represented by the following formula:

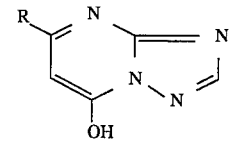

where R is a hydrocarbon group selected from among an alkyl group, an alkoxy group, and an alkylamide group.

Tetrazinedene cyclic compounds having from 3 to 20 carbon atoms are particularly preferable. In the case of an alkoxy group, R in ROCOCH 2—may be $C_3H_7$—, $C_6H_{13}$—, or phenyl. In the case of an alkyl group, R maybe $C_6H_7$—, $C_9H_{19}$—, or $C_{17}H_{35}$—. In the case of an alkylamide group, R in RNHCOCH$_2$—may be phenyl, or $C_3H_7$—.

Examples of thiouracil cyclic compounds are those which are represented by the following formula:

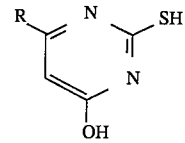

EXAMPLES

The present invention will be explained below more specifically by way of Examples of the present invention and Comparative examples.

On a polyethylene terephthalate film of 10 μm in thickness having a spherical silica filler of 18 nm in particle diameter on the surface thereof, a cobalt-nickel alloy Co/Ni= 95/5 was obliquely deposited to a thickness of 70 nm twice in an oxygen-containing atmosphere so that the incidence angle of a magnetic metal vapor stream to the polyethylene terephthalate was 45°, thereby obtaining a ferromagnetic metal film consisting of two magnetic layers having a total thickness of 140 nm. It should be noted that the thin films constituting the two layers were formed so that columnar crystals of magnetic metal constituting the thin films were inclined in the same direction. Thereafter, heat treatment was carried out for uncurling.

Example 1 and Comparative Examples 1 to 4

On the back surf ace of the non-magnetic base of polyethylene terephthalate, a back coat layer consisting essentially of carbon black and a resin binder was formed by a solution coating method. Thereafter, a mixed ethanol solution of a phosphoric monoester compound, a fluorine-containing fatty acid ester compound and a fluorinated hydrocarbon, shown in Table 1, was coated on the; ferromagnetic metal thin film by a wire bar method and then dried.

The coating weight of each compound per unit area of the ferromagnetic metal thin film was as follows: The phosphoric monoester compound was 3 mg/m$^2$; the fluorine-containing fatty acid ester compound was 5 mg/m$^2$; and the fluorinated hydrocarbon was 5 mg/m$^2$.

The material thus produced was slit into a magnetic recording medium of 8 mm in width, which was then incorporated into a magnetic tape cassette for 8-mm VTR, thereby preparing each sample for measurement.

Examples 2 to 9 and Comparative Examples 5 to 7

After a methyl ethyl ketone solution of a phosphoric monoester shown in Table 1 had been coated on the magnetic layer, a back coat consisting essentially of carbon black and a resin binder was formed on the back surface of the non-magnetic base. Further, a mixed ethanol solution of a fluorine-containing fatty acid ester and a fluorinated hydrocarbon, shown in Table 1, was coated on the back coat and then dried.

The coating weight of each compound per unit area of the ferromagnetic metal thin film was as follows.

The phosphoric monoester compound was 3 mg/m$^2$; the fluorine-containing fatty acid ester compound was 5 mg/m$^2$; and the fluorinated hydrocarbon was 5 mg/m$^2$.

The material thus produced was slit into a magnetic recording medium of 8 mm in width for 8-mm VTR, which was then incorporated into a magnetic tape cassette for 8-mm VTR, thereby preparing each sample for measurement.

Example 10 and Comparative Examples 8 to 11

Magnetic recording medium samples were prepared under the same conditions as in the above-described Examples and Comparative Examples excerpt that a carbon protective film was formed by a plasma CVD method, which will be described below, on the above-described ferromagnetic metal thin film.

Methane was supplied at a flow rate of 150 sccm as a raw material, and argon was supplied at a flow rate of 50 sccm as a carrier. Further, a radio-frequency power of 600 W was applied, and a DC voltage of −400 V was applied to the magnetic layer surface through a pass roller. In addition, a DC voltage of +500 V was applied to an anode installed in the gas inlet, thereby accelerating the plasma generated, and thus forming a rigid carbon protective film of diamond-like carbon on the surface of the magnetic layer at a temperature of 20° C. and at a transfer speed of 5 m/min.

The carbon protective film thus obtained had a film thickness of 80 nm, and it was confirmed by Raman spectroscopy that the carbon protective film was diamond-like carbon. The Vickers hardness of another protective film formed by the same method was 2,200 kg/mm$^2$.

Further, a methyl ethyl ketone solution of a phosphoric monoester shown in Table 1 was coated on the carbon protective film and then dried, and a back coat layer consisting essentially of carbon black and a resin binder was formed on the back surface of the non-magnetic base. A mixed ethanol solution of a fluorine-containing fatty acid ester and a fluorinated hydrocarbon, shown in Table 1, was coated on the back coat layer and then dried. The material thus produced was slit into a magnetic tape of 8 mm in width for 8-mm VTR, which was then incorporated into a magnetic tape cassette for 8-mm VTR, thereby preparing each sample for measurement.

TABLE 1

| | Phosphoric monoester compound | Fluorine-containing fatty acid ester compound | Fluorinated hydrocarbon |
| --- | --- | --- | --- |
| Ex. 1 | $CH_3(CH_2)_{11}OPO_3H_2$ | $CF_3(CF_2)_7COO(CH_2)_{16}CH_3$ | $CF_3(CF_2)_7(CH_2)_{17}CH_3$ |
| Comp. Ex. 1 | $CH_3(CH_2)_{11}OPO_3H_2$ | $CF_3(CF_2)_7COO(CH_2)_{16}CH_3$ | Not coated |
| Comp. Ex. 2 | $CH_3(CH_2)_{11}OPO_3H_2$ | Not coated | $CF_3(CF_2)_7(CH_2)_{17}CH_3$ |
| Comp. Ex. 3 | Not coated | $CF_3(CF_2)_7COO(CH_2)_{16}CH_3$ | $CF_3(CF_2)_7(CH_2)_{17}CH_3$ |
| Comp. Ex. 4 | Not coated | Not coated | Not coated |
| Ex. 2 | $CH_3(CH_2)_{11}OPO_3H_2$ | $CF_3(CF_2)_7COO(CH_2)_{16}CH_3$ | $CF_3(CF_2)_7(CH_2)_{17}CH_3$ |
| Comp. Ex. 5 | $CH_3(CH_2)_{11}OPO_3H_2$ | $CF_3(CF_2)_7COO(CH_2)_{16}CH_3$ | Not coated |
| Comp. Ex. 6 | $CH_3(CH_2)_{11}OPO_3H_2$ | Not coated | $CF_3(CF_2)_7(CH_2)_{17}CH_3$ |
| Comp. Ex. 7 | Not coated | $CF_3(CF_2)_7COO(CH_2)_{16}CH_3$ | $CF_3(CF_2)_7(CH_2)_{17}CH_3$ |
| Ex. 3 | $CH_3(CH_2)_{11}OPO_3H_2$ | $CF_3(CF_2)_7COO(CH_2)_{16}CH_3$ | $CF_3(CF_2)_5(CH_2)_8(CF_2)_5CF_3$ |
| Ex. 4 | $CH_3(CH_2)_{11}OPO_3H_2$ | $CF_3(CF_2)_7COO(CH_2)_{16}CH_3$ | $(CF_3)_2CF(CF_2)_6(CH_2)_{13}CH_3$ |
| Ex. 5 | $CH_3(CH_2)_{11}OPO_3H_2$ | $CH_3(CH_2)_{16}COO(CH_2)_2(CF_2)_7CF_3$ | $(CF_3)_2CF(CF_2)_6(CH_2)_{13}CH_3$ |
| Ex. 6 | $CH_3(CH_2)_{11}OPO_3H_2$ | $CH_3(CH_2)_4CH=CHCH_2CH=CH(CH_2)_7COO(CH_2)_2(CF_2)_7CF_3$ | $(CF_3)_2CF(CF_2)_6(CH_2)_{13}CH_3$ |
| Ex. 7 | $CH_3(CH_2)_{11}OPO_3H_2$ | $CF_3(CF_2)_5(CH_2)_{10}COO(CH_2)_2(CF_2)_7CF_3$ | $(CF_3)_2CF(CF_2)_6(CH_2)_{13}CH_3$ |
| Ex. 8 | $CH_3(CH_2)_{15}OPO_3H_2$ | $CF_3(CF_2)_5(CH_2)_{10}COO(CH_2)_2(CF_2)_7CF_3$ | $(CF_3)_2CF(CF_2)_6(CH_2)_{13}CH_3$ |
| Ex. 9 | $CH_3(CH_2)_{17}OPO_3H_2$ | $CF_3(CF_2)_5(CH_2)_{10}COO(CH_2)_2(CF_2)_7CF_3$ | $(CF_3)_2CF(CF_2)_6(CH_2)_{13}CH_3$ |
| Ex. 10 | $CH_3(CH_2)_{11}OPO_3H_2$ | $CF_3(CF_2)_7COO(CH_2)_{16}CH_3$ | $CF_3(CF_2)_7(CH_2)_{17}CH_3$ |
| Comp. Ex. 8 | $CH_3(CH_2)_{11}OPO_3H_2$ | $CF_3(CF_2)_7COO(CH_2)_{16}CH_3$ | Not coated |
| Comp. Ex. 9 | $CH_3(CH_2)_{11}OPO_3H_2$ | Not coated | $CF_3(CF_2)_7(CH_2)_{17}CH_3$ |
| Comp. Ex. 10 | Not coated | $CF_3(CF_2)_7COO(CH_2)_{16}CH_3$ | $CF_3(CF_2)_7(CH_2)_{17}CH_3$ |
| Comp. Ex. 11 | Not coated | Not coated | Not coated |

Each magnetic recording medium sample obtained as described above was measured for the coefficient of friction, still durability, repeated running durability, and corrosion resistance under the following conditions.

The results of the measurement are shown in Table 2.

Evaluation Method

1. Measurement of coefficient of friction (μvalue)

Each magnetic tape was brought into contact with a stainless steel pole (material: SUS420J) at a winding angle of 180° under a tension ($T_1$) of 20 g at 23° C. and 70% RH. A tension ($T_2$) required to run the magnetic tape at a speed of 3.3 cm/sec. under the above-described condition was measured, and the friction coefficient μ of the magnetic tape was determined from the following formula on the basis of the measured value:

$$\mu = 1/\pi \ln(T_2/T_1)$$

2. Measurement of still durability
(Condition A)

A color bar image was recorded at a running tension of 20 g by using an 8-mm VTR. (FUJIX-M6, a product of Fuji Photo Film Co., Ltd.) under the environmental conditions of 23° C. and 10% RH. Then, the recorded image was reproduced in the still mode with the still limiting mechanism left inoperative, and a time taken until the output reached −6 dB with respect to the initial output was measured to evaluate the still durability.
(Condition B)

A color bar signal was recorded by using a commercially available 8-mm movie camera (FUJIX-V88, a product of Fuji Photo Film Co., Ltd.) at −10° C. Then, the recorded image was reproduced in the still mode with the still limiting mechanism left inoperative, and a time taken until the output reached −6 dB with respect to the initial output was measured to evaluate the still durability.
(Condition C)

A color bar image was recorded by using an 8-mm VTR (EV-S700, a product of Sony Corporation), remodeled so that the number of revolutions of the cylinder was twice as large as the ordinary number of revolutions, under the environmental conditions of 5° C. and 10% RH. Then, the recorded image was reproduced in the still mode with the still limiting mechanism left inoperative, and a time taken until the output reached −6 dB with respect to the initial output was measured to evaluate the still durability.

3. Evaluation of repeated running durability

A single-wave signal of 7.6 MHz was recorded for 60 minutes by using an 8-mm VTR (EV-S1500, a product of Sony Corporation) under the environmental conditions of 23° C. and 10% RH, and then the recorded signal was continuously reproduced 100 times. A change in output and head contamination after playback had been performed 100 times were examined. Head contamination was evaluated as follows:

no contamination was observed on either of the sliding and non-sliding portions of the head;

contamination was clearly observed on the sliding portion; and results of examination other than the above.

4. Corrosion resistance

Each magnetic recording medium was stored for 72 hours under the environmental conditions of 27° C., 80% RH and sulfurous acid gas content of 1 ppm. After the storage, the surface of the tape was visually observed to evaluate the corrosion resistance as follows:

there was no substantial change during the storage;

corrosion was observed, although metallic luster was left on the whole surface of the tape; and part or the whole of the magnetic layer was corroded away.

TABLE 2

| | Friction coefficient | Still durability (min) | | | Repeated running durability | | Corrosion resistance |
|---|---|---|---|---|---|---|---|
| | | Cond. A | Cond. B | Cond. C | Output (dB) | Head contamination | |
| Ex. 1 | 0.25 | 21 | 15 | 10 | −2.5 | Δ | ○ |
| Comp. Ex. 1 | 0.25 | 9 | 5 | 2 | −3.0 | Δ | ○ |
| Comp. Ex. 2 | 0.25 | 8 | 4 | 2 | ≦−6.0 | X | ○ |
| Comp. Ex. 3 | 0.23 | 4 | 2 | 2 | ≦−6.0 | X | ○ |
| Comp. Ex. 4 | ≧0.50 | 1 | 1 | 1 | ≦−6.0 | X | X |
| Ex. 2 | 0.21 | 27 | 20 | 12 | −1.5 | Δ | ○ |
| Comp. Ex. 5 | 0.20 | 13 | 8 | 4 | −2.2 | Δ | ○ |
| Comp. Ex. 6 | 0.25 | 12 | 4 | 4 | ≦−6.0 | X | ○ |
| Comp. Ex. 7 | 0.23 | 10 | 2 | 2 | ≦−6.0 | X | ○ |
| Ex. 3 | 0.22 | 35 | 28 | 15 | −2.0 | Δ | ○ |
| Ex. 4 | 0.22 | 30 | 25 | 20 | −1.8 | Δ | ○ |
| Ex. 5 | 0.23 | 27 | 18 | 10 | −2.5 | Δ | ○ |
| Ex. 6 | 0.22 | 38 | 25 | 15 | −1.9 | Δ | ○ |
| Ex. 7 | 0.23 | 29 | 18 | 18 | 1.8 | Δ | ○ |
| Ex. 8 | 0.21 | 25 | 21 | 12 | −1.8 | Δ | ○ |
| Ex. 9 | 0.20 | 29 | 22 | 15 | −1.9 | Δ | ○ |
| Ex. 10 | 0.25 | ≧120 | ≧120 | ≧120 | −2.5 | Δ | ○ |
| Comp. Ex. 8 | 0.25 | 58 | 92 | 68 | −3.1 | Δ | ○ |
| Comp. Ex. 9 | 0.31 | ≧120 | 82 | 72 | −4.5 | X | ○ |
| Comp. Ex. 10 | 0.29 | 15 | 10 | 5 | −3.9 | X | ○ |
| Comp. Ex. 11 | ≧0.50 | 1 | 1 | 1 | ≦−6.0 | X | X |

As will be clear from the foregoing description, a specific phosphoric monoester compound which is represented by the chemical formula (1), a specific fluorine-containing fatty acid ester compound which is represented by the chemical formula (2), and a fluorinated hydrocarbon in which some of the hydrogen atoms of a hydrocarbon having from 14 to 40 carbon atoms have been replaced by fluorine atoms, are allowed to be present on a ferromagnetic metal thin film, whereby it is possible to obtain a magnetic recording medium which has excellent running properties, and which is also excellent in durability and corrosion resistance under various environmental conditions.

What we claim is:

1. A magnetic recording medium having a magnetic layer of a ferromagnetic metal thin film over at least one surface of a non-magnetic base, wherein a phosphoric monoester compound which is represented by the following chemical formula (1), a fluorine-containing fatty acid ester compound which is represented by the following chemical formula (2), and a fluorinated hydrocarbon in which some of hydrogen atoms of a hydrocarbon having from 14 to 40 carbon atoms have been replaced by fluorine atoms, are present on said magnetic layer:

$$R_1\text{—OPO(OH)}_2 \quad (1)$$

where $R_1$ is a hydrocarbon group having from 8 to 26 carbon atoms $$R_2\text{—COO—}R_3 \quad (2)$$

where $R_2$ and $R_3$ are each a hydrocarbon group having from 8 to 26 carbon atoms, or a fluorinated hydrocarbon group in which some or all of hydrogen atoms of a hydrocarbon group having from 8 to 26 carbon atoms have been replaced by fluorine atoms; $R_2$ and $R_3$ may be the same or different from each other; and at least either one of $R_2$ and $R_3$ contains fluorine atoms.

2. A magnetic recording medium having a magnetic layer of a ferromagnetic metal thin film over one surface of a non-magnetic material, and a back coat layer consisting essentially of a non-magnetic powder and a binder resin, said back coat layer being provided on the other surface of said non-magnetic material, wherein said magnetic layer comprises:

(A) a phosphoric monoester compound which is represented by the following chemical formula (1):

$$R_1\text{—OPO(OH)}_2 \quad (1)$$

wherein $R_1$ is a hydrocarbon group having from 8 to 26 carbon atoms;

(B) a fluorine-containing fatty acid ester compound which is represented by the following chemical formula (2):

$$R_2\text{—COO—}R_3 \quad (2)$$

wherein $R_2$ and $R_3$ are each a hydrocarbon group having from 8 to 26 carbon atoms or a fluorinated hydrocarbon group having from 8 to 26 carbon atoms in which some or all of the hydrogen atoms have been replaced by fluorine atoms, $R_2$ and $R_3$ may be the same or different from each other, and at least one of $R_2$ and $R_3$ contains fluorine atoms; and (C) a fluorinated hydrocarbon compound having from 14 to 40 carbon atoms in which some of the hydrogen atoms have been replaced by fluorine atoms, and wherein said back coat layer contains at least one of said fluorine-containing fatty acid ester compound (B) and fluorinated hydrocarbon compound (C).

3. A magnetic recording medium having a magnetic layer of a ferromagnetic metal thin film over at least one surface of a non-magnetic base, wherein a protective film is provided on said magnetic layer, and wherein said protective film comprises:

(A) a phosphoric monoester compound which is represented by the following chemical formula (1):

$$R_1\text{—OPO(OH)}_2 \quad (1)$$

wherein $R_1$ is a hydrocarbon group having from 8 to 26 carbon atoms;

(B) a fluorine-containing fatty acid ester compound which is represented by the following chemical formula (2):

$$R_2\text{—COO—}R_3 \quad (2)$$

wherein $R_2$ and $R_3$ are each a hydrocarbon group having from 8 to 26 carbon atoms or a fluorinated hydrocarbon group having from 8 to 26 carbon atoms in which some or all of the hydrogen atoms have been replaced by fluorine atoms, $R_2$ and $R_3$ may be the same or different from each other, and at least one of $R_2$ and $R_3$ contains fluorine atoms; and (C) a fluorinated hydrocarbon compound having from 14 to 40 carbon atoms in which some of the hydrogen atoms have been replaced by fluorine atoms.

4. A magnetic recording medium having a magnetic layer of a ferromagnetic metal thin film over one surface of a non-magnetic material, and a back coat layer consisting essentially of a non-magnetic powder and a binder resin, said back coat layer being provided on the other surface of said non-magnetic material, wherein a protective film is provided on said magnetic layer, and wherein said protective film comprises:

(A) a phosphoric monoester compound which is represented by the following chemical formula (1):

$$R_1\text{—OPO(OH)}R_2 \quad (1)$$

wherein $R_1$ is a hydrocarbon group having from 8 to 26 carbon atoms;

(B) a fluorine-containing fatty acid ester compound which is represented by the following chemical formula (2):

$$R_2\text{—COO—}R_3 \quad (2)$$

wherein $R_2$ and $R_3$ are each a hydrocarbon group having from 8 to 26 carbon atoms or a fluorinated hydrocarbon group having from 8 to 26 carbon atoms in which some or all of the hydrogen atoms have been replaced by fluorine atoms, $R_2$ and $R_3$ may be the same or different from each other, and at least one of $R_2$ and $R_3$ contains fluorine atoms; and (C) a fluorinated hydrocarbon compound having from 14 to 40 carbon atoms in which some of the hydrogen atoms have been replaced by fluorine atoms, and wherein said back coat layer contains at least one of said fluorine-containing fatty acid ester compound (B) and fluorinated hydrocarbon compound (C).

* * * * *